US011594173B1

(12) United States Patent
Rycyna, III et al.

(10) Patent No.: US 11,594,173 B1
(45) Date of Patent: Feb. 28, 2023

(54) MODULAR DISPLAY SYSTEM WITH WIRELESS MESH NETWORKING

(71) Applicant: Cirrus Systems, Inc., Portsmouth, NH (US)

(72) Inventors: Stephen David Rycyna, III, Stratham, NH (US); Roshan Barua, Falmouth, ME (US); Christian Knight, Saco, ME (US)

(73) Assignee: Cirrus Systems, Inc., Portsmouth, NH (US)

( * ) Notice: Subject to any disclaimer, the term of this patent is extended or adjusted under 35 U.S.C. 154(b) by 0 days.

(21) Appl. No.: 17/557,571

(22) Filed: Dec. 21, 2021

Related U.S. Application Data (60) Provisional application No. 63/128,525, filed on Dec. 21, 2020.

(51) Int. Cl.
*G09G 3/32* (2016.01)
*G09G 3/20* (2006.01)

(52) U.S. Cl.
CPC ............ *G09G 3/32* (2013.01); *G09G 3/2003* (2013.01); *G09G 2310/08* (2013.01); *G09G 2360/04* (2013.01); *G09G 2360/18* (2013.01); *G09G 2370/02* (2013.01)

(58) Field of Classification Search
CPC ......... G09G 2370/16; G09G 2370/022; G09G 2370/025; G09G 2370/02; G09G 2370/10; G09G 2354/00; G09G 5/14; G09G 5/12; G09G 2356/00; G09G 2380/06; G09G 2340/0492; G09G 2300/026; G09G 2360/122; G06G 2360/122
See application file for complete search history.

(56) References Cited

U.S. PATENT DOCUMENTS

| | | | |
|---|---|---|---|
| 8,797,233 B2 | 8/2014 | Jenks et al. |
| 8,970,448 B2 | 3/2015 | Jenks et al. |
| 8,992,037 B2 | 3/2015 | Rycyna, III |
| 9,058,763 B2 | 6/2015 | Burgess et al. |
| 9,195,281 B2 | 11/2015 | Hall |
| 9,207,904 B2 | 12/2015 | Hall |
| 9,741,316 B2 | 8/2017 | Loeffler et al. |
| 9,817,627 B2 | 11/2017 | Kreiner et al. |

(Continued)

FOREIGN PATENT DOCUMENTS

KR   102121272 B1   6/2020

OTHER PUBLICATIONS

Glenn Fleishman, "Wireless mesh networks: Everything you need to know", May 5, 2020, PCWorld, https://www.pcworld.com/article/407165/mesh-network-explained.html (Year: 2020).*

(Continued)

*Primary Examiner* — Dong Hui Liang
(74) *Attorney, Agent, or Firm* — Clocktower Law LLC; Erik J. Heels; Michael A. Bartley (57) ABSTRACT

An architecture and method of operation is described for a modular display utilizing wireless mesh networked individual display modules. A controller acts as a master node in the mesh network and sends image data to each individual display module. Each display module acts as a node in the mesh network, asynchronously processes received image data into a memory buffer, and periodically updates the display output to maintain a seamless display.

12 Claims, 6 Drawing Sheets

(56) References Cited

U.S. PATENT DOCUMENTS

| | | | |
|---|---|---|---|
| 9,916,782 B2 | 3/2018 | Hall | |
| 10,409,542 B2 | 11/2019 | Huang et al. | |
| 2004/0233125 A1* | 11/2004 | Tanghe | G09G 3/3216 |
| | | | 345/1.3 |
| 2006/0093044 A1* | 5/2006 | Grantham | G06F 9/3851 |
| | | | 386/239 |
| 2015/0002371 A1* | 1/2015 | Burgess | G09G 5/12 |
| | | | 345/1.2 |
| 2015/0145749 A1 | 5/2015 | Inamoto et al. | |
| 2015/0187333 A1* | 7/2015 | Loeffler | G09G 5/008 |
| | | | 345/1.3 |
| 2017/0061930 A1* | 3/2017 | Iuchi | G06F 3/0445 |
| 2018/0090054 A1* | 3/2018 | Zhang | G09G 3/2096 |
| 2020/0090580 A1 | 3/2020 | Hyeon et al. | |

OTHER PUBLICATIONS

Glenn, Fleishman, "Wireless mesh networks: Everything you need to know", May 5, 2020, PCWorld, https://www.pcworld.com/article/407165/mesh-network-explained.html (Year: 2022).*

* cited by examiner

MODULAR DISPLAY SYSTEM WITH WIRELESS MESH NETWORKING

CROSS-REFERENCE TO RELATED APPLICATIONS

This utility patent application claims priority from U.S. provisional patent application Ser. No. 63/128,525, filed Dec. 21, 2020, titled "Modular Display System with Wireless Mesh Networking", and naming inventors Stephen David Rycyna III, Roshan Barua, and Christian Knight.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2021, Cirrus Systems, Inc.

BACKGROUND

Field of Technology

This relates to electronic signage and display systems, and more particularly to communication and control of wireless multi-panel modular displays.

Background

Billboards and other types of large signs are used extensively to advertise and present products and ideas to the public. Recently, light-emitting diodes (LEDs) have been used in billboard systems to display programmed messages, images, and videos. Particularly, LED-based modular display systems have been developed that can be conveniently customized to form an electronic billboard with a specified size.

Currently, sending video and control data throughout a modular display system involves the use of video sending units, which interface with the video output signal of a multimedia source (e.g. A PC with HDMI, DVI, VGA, etc.) and convert the video signal into a data stream which is sent to the display modules using a suitable interface and protocol. These systems may also need to use control cards that are external or internal to the display modules and may require additional connections. Delivering both power and video signal requires additional connections at each unit, or bundling video and power together which requires additional shielding in cable. The additional hardware components or shielding required add complexity and cost to the overall system.

U.S. Pat. No. 8,992,037, titled Modular Variable Presentation System, naming inventor Stephen David Rycyna, III, and issued Mar. 31, 2015, which is hereby fully incorporated by reference, discloses a modular display system including a modular support framework and display modules that can be mounted within the framework.

U.S. Pat. No. 10,338,874, titled Modular Display System with Automatic Locating Features, naming inventors Stephen David Rycyna, III and Grant Elliott, and issued Jul. 2, 2019, which is hereby fully incorporated by reference, enhances the modular display system by including locating or index sensors on each display module enabling automatic configuration of the entire display and locations of each individual module.

U.S. Pat. Pub. No. 2019/0377535, titled Modular Display System with Ethernet Connection and Control, naming inventors Stephen David Rycyna, Christian Knight, and Roshan Barua, and published Dec. 12, 2019, which is hereby fully incorporated by reference, enhances the modular system by detailing control and display data communication over ethernet connections.

The existing modular display system enables large displays of configurable size capable of high resolution, high frame rate full color video display. As variable zoning and other local ordinances may control sizing of displays, making the configurable size desirable, in many cases they may also restrict display use, such as limiting color or barring video playback. In other situations, use as a messaging or more static display may make full color and high frame rate video unnecessary.

What is needed, therefore, is a modular display system that is more cost efficient and convenient for end users, providing a less expensive solution that meets more restrictive ordinances or lesser performance requirements.

BRIEF SUMMARY

An architecture and method of operation is described for a modular display utilizing wireless mesh networked individual display modules. A controller acts as a master node in the mesh network and sends image data to each individual display module. Each display module acts as a node in the mesh network, asynchronously processes received image data into a memory buffer, and periodically updates the display output to maintain a seamless display.

In situations where large modular displays are desirable, but high speed video is not required, replacing the ethernet connections with wireless mesh networking components enables a less expensive total system.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Operation

Existing modular displays, as detailed in the background, provide large screens of configurable size capable of high performance, high resolution video. Significant cost factors include the processor needed in a controller to output 120 frames per second to every display module, processors or microcontrollers in every display module capable of handling that video frame rate, and cables connecting to every display module which require shielding to bundle power and data into one cable with weather proof connections to enable safe and reliable outdoor operation.

A wireless communication solution enables a modular display with similar framing and display modules, but at lower speeds and higher latency due to current limitations of wireless communications. A large modular display using a wireless mesh network is possible as detailed herein.

Both the controller and each display module include a processor or microcontroller executing software stored in a non-transitory computer-readable media such as firmware or connected storage to perform the actions detailed herein.

The controller, or control unit, needs to communicate with the display modules and deliver correct display data to each module. To do so, a screen-scraping procedure is used. The controller processes a source (video or image data file) to display through a display adapter such as a graphics or video card or integrated processor. The display adapter renders the output to any connected display, or as a digital desktop if no display is connected to the display adapter. The controller may then screen scrape the rendered desktop to capture portions of an image to deliver to individual display modules. The source file may be stored on the controller, streamed to the controller over a network connection, or accessed via disk, flash drive, or other removable media.

Figure 1:
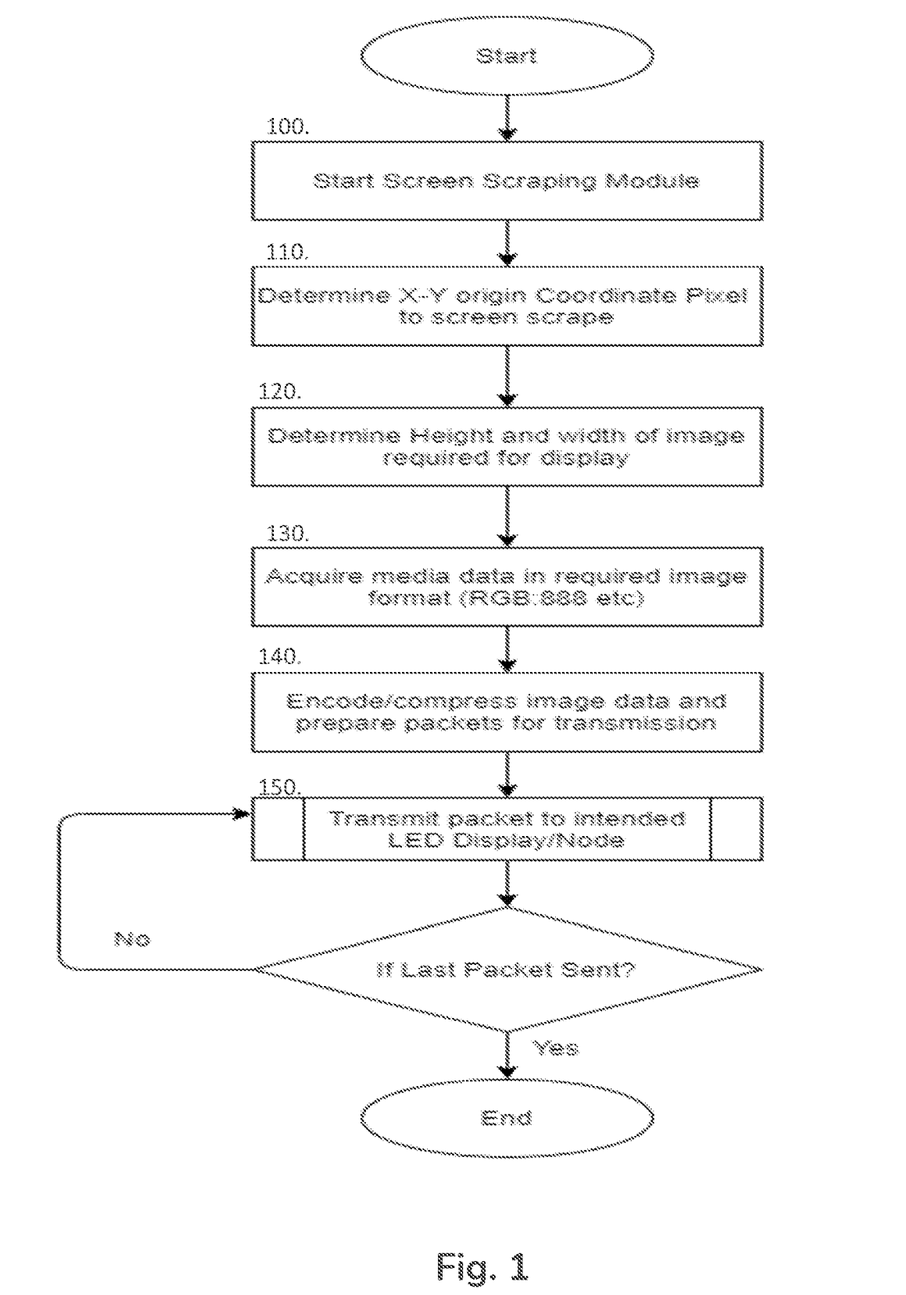
FIG. 1 is a flowchart of a screen-scraping process for preparing image data to be sent to each display module.

Referring to FIG. 1, the controller scrapes 100 the rendered display data within the digital desktop to create an image which is a 1:1 pixel map of the rendered display data. Using this pixel map, the controller sends specific image display data to specific display modules. Based on the resolution of the rendered display data, and resolution of the modular display (based on the number of modules and layout), for any specific display module the controller parses from a specific x-y starting coordinate 110 for the display the portion 120 (for example, 32 pixels in height by 64 pixels in width) of the rendered display data to deliver to that display module. The controller grabs 130 8 bits values for red, green, and blue brightness data (RGB:888 format) for every pixel (in the example, 32 pixels in height and 64 pixels in width). This grabbed data is processed 140 into a bitmap format for construction of packet data to send 150 to the specific display module.

Figure 2:
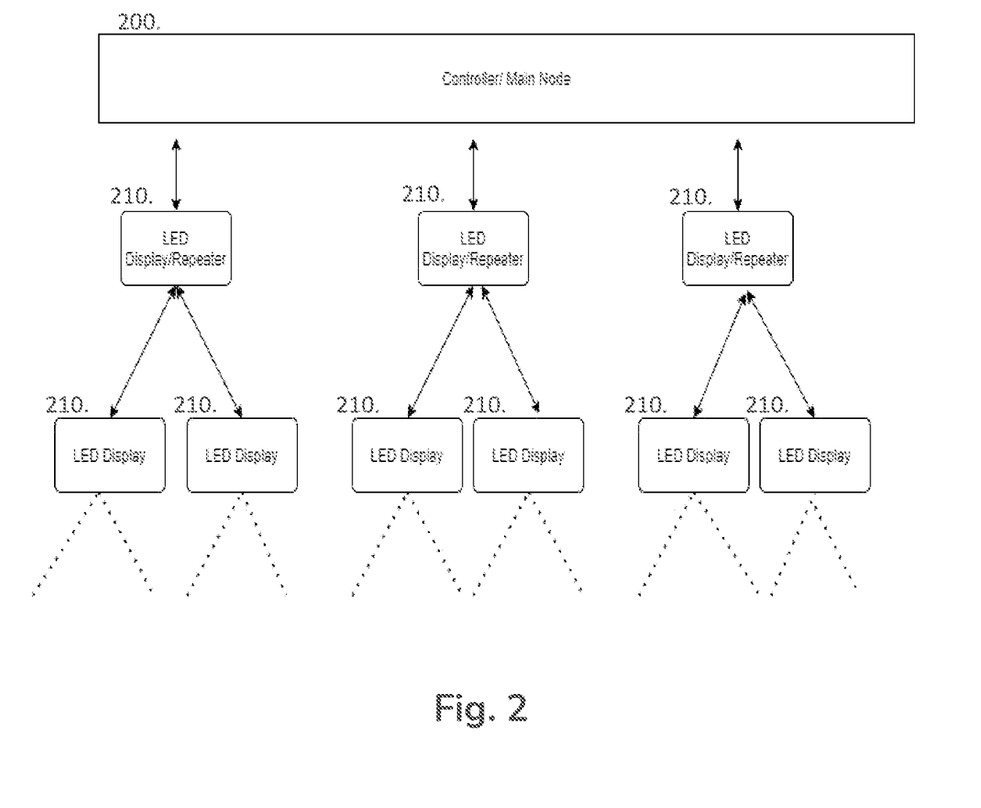
FIG. 2 illustrates a wireless mesh topology for use with the modular display system.

Referring also to FIG. 2, the controller 200 may act as a main node in a full duplex wireless mesh network, with each display module 210 acting as additional nodes in the mesh network. Packets containing the image data are transmitted across the wireless network from the controller to the specific destination display module. The controller and each display module includes a wireless communication module. Due to the close proximity of display modules once framed to form the larger display, different wireless communication modules may be used, such as WiFi (i.e., IEEE 802.11a/b/g/n), Bluetooth, Near-Field Communication (NFC), Ultra High Frequency (UHF), or other wireless module, as long a compatibility of communication modules is maintained between the controller and the display modules. Wireless mesh routing protocols, such as, but not limited to, a hybrid wireless mesh protocol (HWMP), may optimize routing of packets from the controller to the destination display module.

Figure 3:
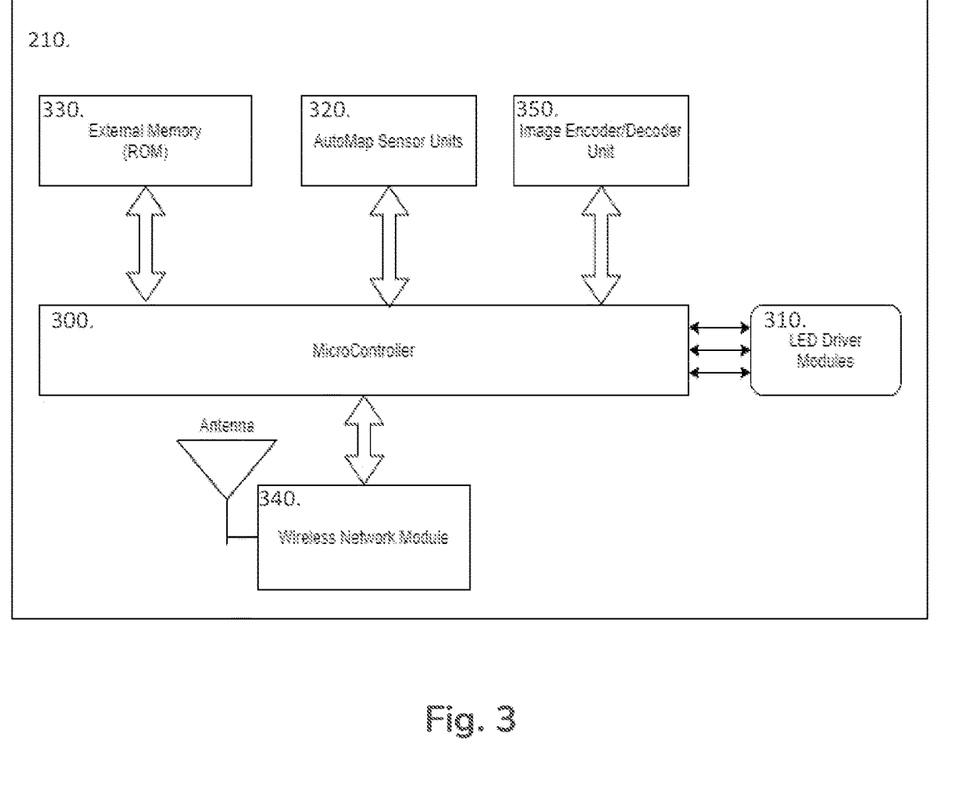
FIG. 3 illustrates the hardware architecture within each display module.

Referring also to FIG. 3, each display module 210 includes a processor or microcontroller 300 connected to and in communication with LED drivers 310 controlling the individual LEDs of the module, sensors 320 for automatic locating of the module within the larger multi-module display, memory 330 for buffering images to display, wireless communication module 340 for communicating with the mesh network, and an image processing unit 350 for decoding received images into a desired output format. Power in and power out connectors allow daisy-chaining power from module to module and minimizes total power cabling needed. The memory may be internal non-volatile memory, or attached memory such as a flash drive, with total memory capacity controlling the number of images that may be buffered at the display.

Figure 4:
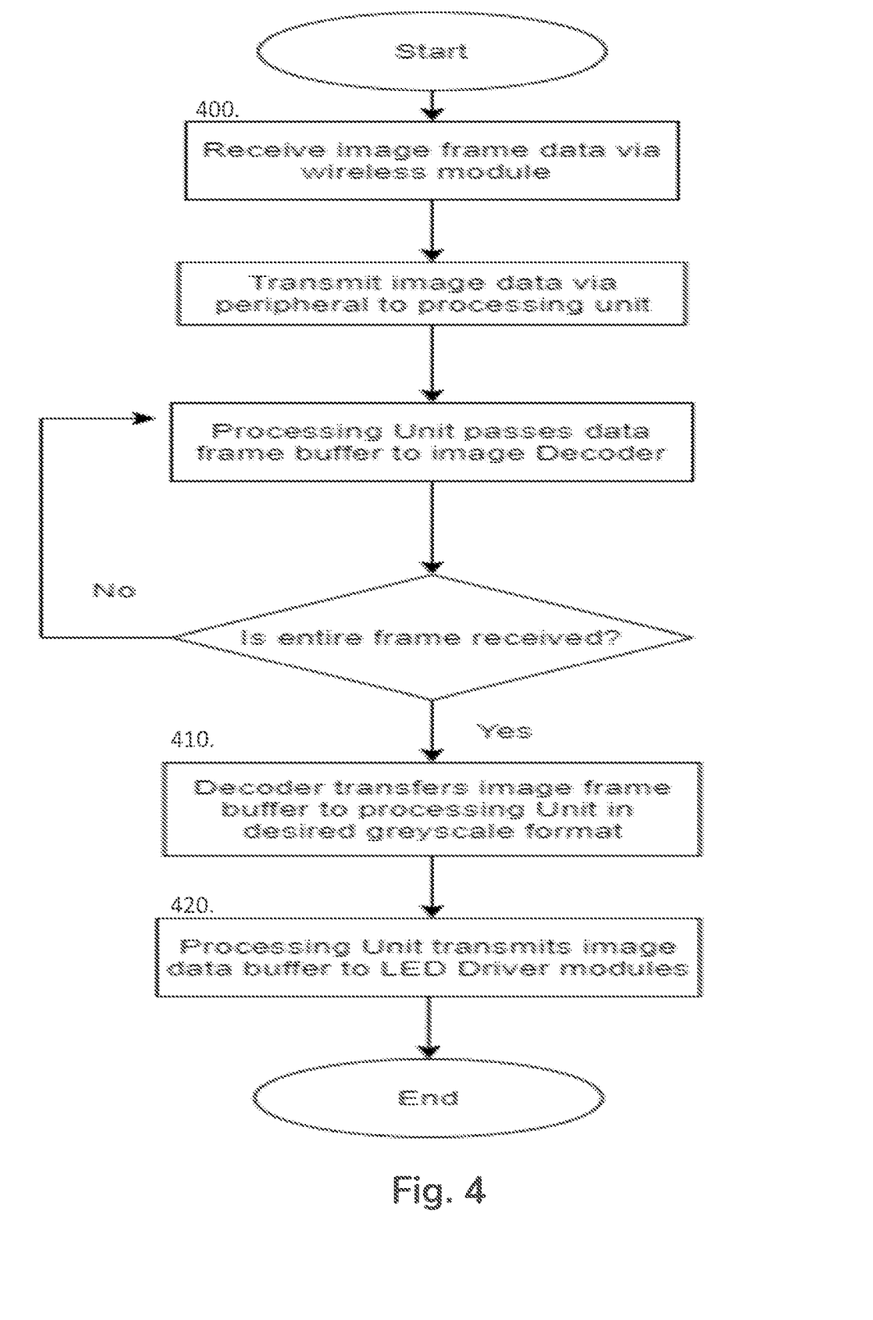
FIG. 4 is a flowchart of image data processing upon receipt at a display module.
Figure 5:
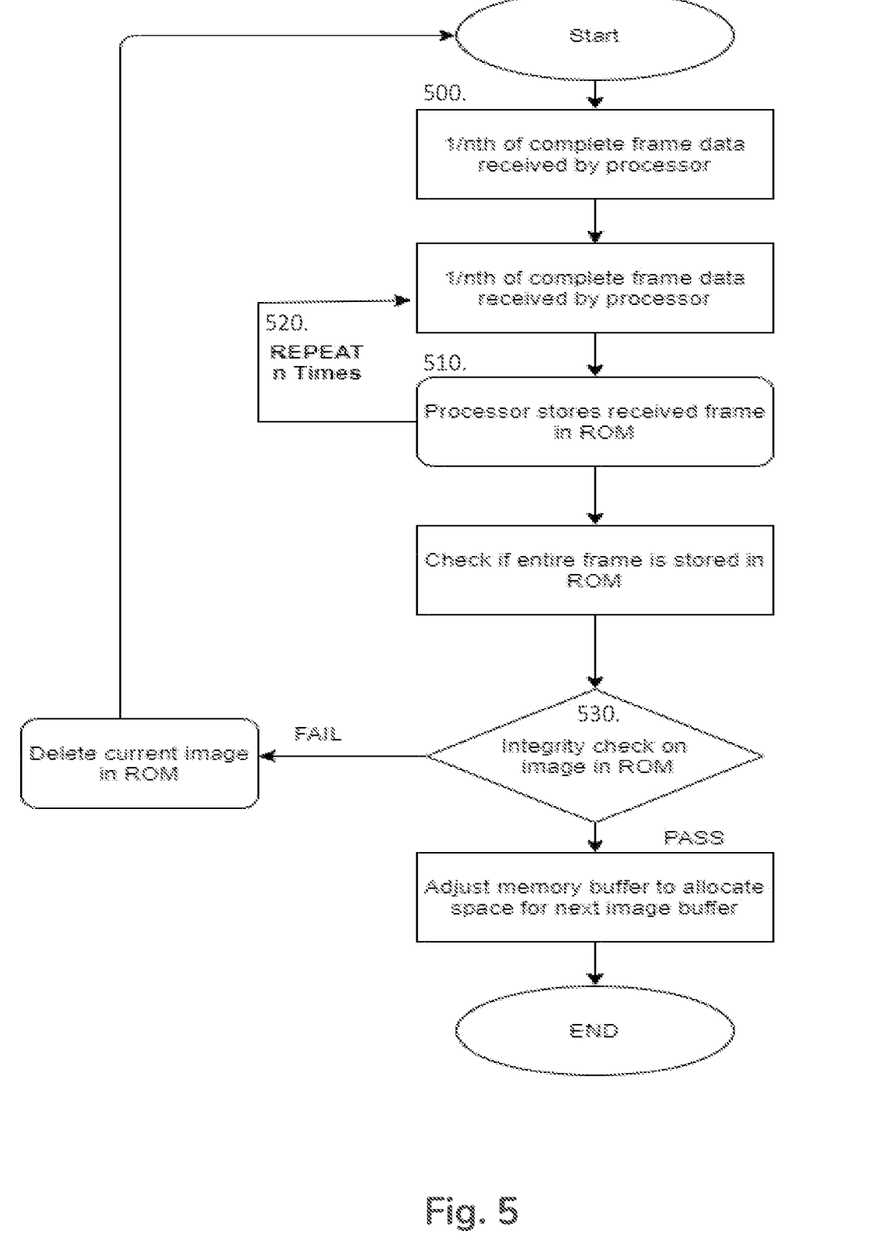
FIG. 5 is a flowchart of image frame storage in memory at a display module.

Referring also to FIGS. 4 & 5, when new image data is received 400 at a display module, packets are processed until an entire frame is received. This involves the processor receiving 500 a portion of the image stored in each packet, storing 510 that portion in a memory buffer, and repeating 520 until the entire frame is received. Once the image is verified 530, the image data is then decoded 410 into the display format, such scaling RGB:888 up to 16-bit RGB (16 bits for each of three color channels) to enable 65 k color depth. The decoded image is then buffered 420 in memory in a display buffer for display by the LED drivers.

Figure 6:
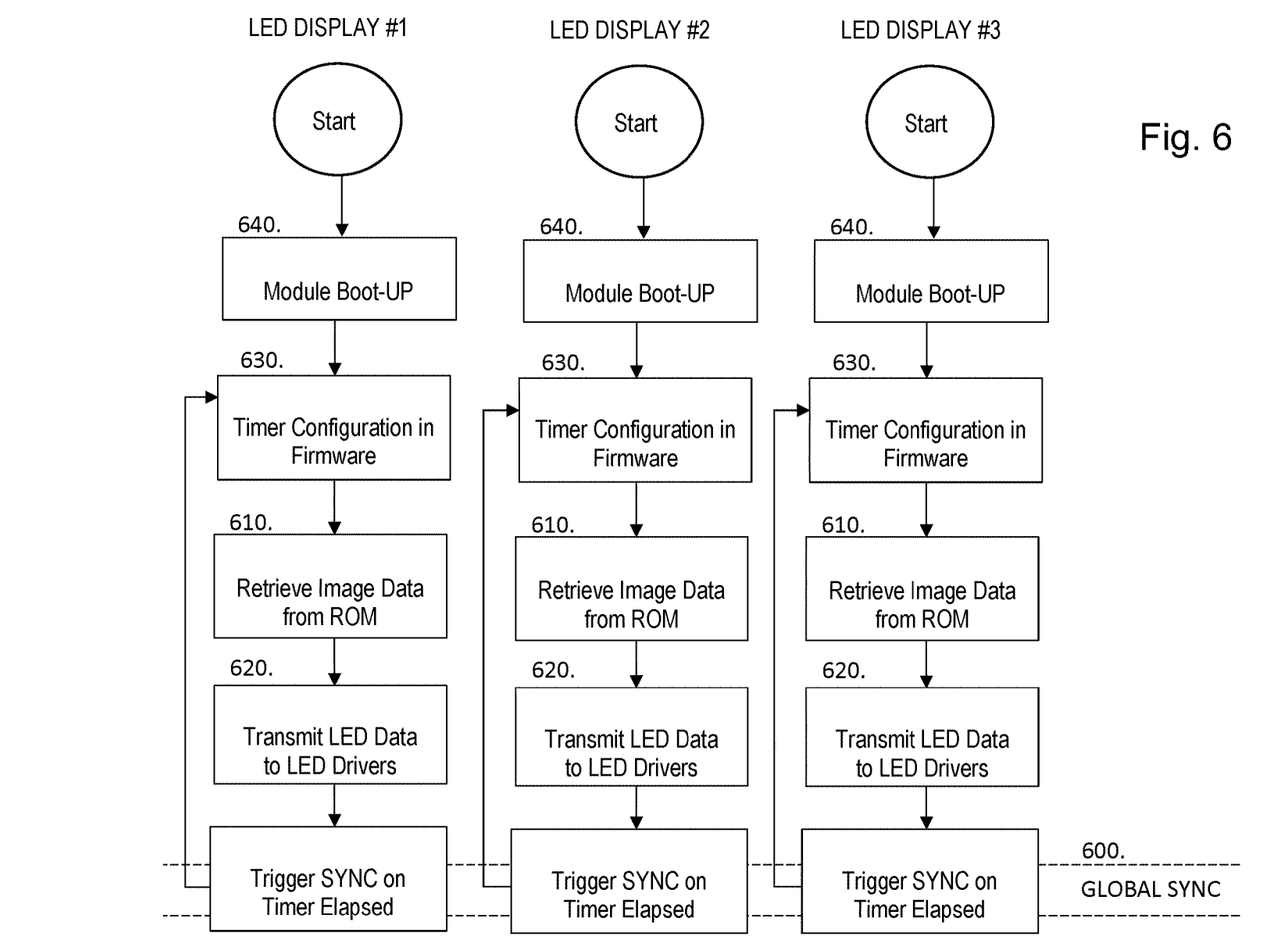
FIG. 6 is a flowchart of synchronization between multiple display modules.

As the image data crosses the mesh network and reaches each display module asynchronously, a synchronization procedure is needed to ensure seamless updating of the multi-module display. Referring also to FIG. 6, the controller (master node) sends a a synchronous signal 600 to all display modules (connected nodes). This acts as a global sync signal, and upon receipt every display module switches the image buffer to retrieve 610 and display the next image stored in the display buffer by transmitting 620 that image data to the LED driver modules. Within each display module, a real-time clock with a battery is interfaced to the processor or microcontroller, and synchronizes with the received global sync signal. Internal timers may be configured 630 within the processor/microcontroller firmware of each display module, and control the timing of further image display updates from the memory buffer. Upon boot 640 of each display, the timer of each display module will start within a minuscule time period difference ~<1 ms of every module in the display. This sync delay is tolerable in a static image display or displays other than high frame rate video.

OTHER EMBODIMENTS

Alternative to RGB:888 image formats, other formats may be used such as RGB:565 or RGB:444. As a further alternative, JPEG/JPG formats may be used, allowing compressed data but requiring more processing at each display module to decompress the image.

Alternative to screen-scraping, images already in a pixel-by-pixel format, such as bitmaps, may be resized to meet the required display size, and then specific regions within the image selected in the same manner as screen-scraping for sending to specific display modules. As another alternative, software on the controller may parse an image file or individual frames of a video file or stream into a pixel-bypixel image in memory, and again specific regions within that image may then be selected in the same manner as screen-scraping for sending to specific display modules. This replaces use of the display adapter and screen-scraping the digital desktop, but increases processing demands on the controller. Supplementary hardware, such as dedication to image processing functions of one core within a dual-core processor, or a field-programmable gate array (FPGA) which can be programmed to execute the image/video processing, may be included in and utilized by the controller.

The global sync signal may be periodically resent or otherwise re-triggered, such as after a display configuration change, from the controller to the display modules to ensure proper synchronization is maintained.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of operating a modular digital display system, comprising:
   operating a display controller processing source data to display on a modular display, and acting as a master node within a wireless mesh network;
   arranging a plurality of display modules to form the modular display, wherein each display module acts as a node within the wireless mesh network and receives data from the display controller to display;
   including a memory for buffering images to display in each display module;
   at a specific display module, receiving one or more network packets each with a portion of a new image to display at the specific display module;
   storing each portion of the new image until an entire frame of the new image is received;
   decoding the entire frame into a display format for the specific display module; and
   storing the decoded frame into a display buffer in the memory.

2. The method of claim 1, further comprising including a wireless communication module for communicating with the mesh network in each of the display modules.

3. The method of claim 2, further comprising:
   including a real-time clock in each display module;
   synchronizing, at each display module, the real-time clock with a received global synchronization signal;
   upon timing controlled by the real-time clock, each display module retrieving a next frame stored in the display buffer; and
   each display module transmitting the next frame to one or more LED drivers of the display module for display.

4. The method of claim 3, further comprising the display controller:
   rendering source data to a display adapter or digital desktop;
   screen scraping the rendered display and creating a one to one pixel map;
   determining, based on a resolution of the rendered display, a number of display modules of the plurality of display modules, and a layout of the modular display, a specific x-y coordinate for a specific display module among the plurality of display modules;
   from the starting x-y coordinate, determining RGB brightness values for every pixel in the pixel map to be displayed on the specific display module;
   constructing the determined RBG brightness values into network packet data; and
   transmitting the constructed network packet data across the mesh network to the specific display module.

5. The method of claim 1, further comprising the display controller:
   rendering source data to a display adapter or digital desktop;
   screen scraping the rendered display and creating a one to one pixel map;
   determining, based on a resolution of the rendered display, a number of display modules of the plurality of display modules, and a layout of the modular display, a specific x-y coordinate for a specific display module among the plurality of display modules;
   from the starting x-y coordinate, determining RGB brightness values for every pixel in the pixel map to be displayed on the specific display module;
   constructing the determined RBG brightness values into network packet data; and
   transmitting the constructed network packet data across the mesh network to the specific display module.

6. A modular digital display system, comprising:
   a display controller processing source data to display on a modular display, and acting as a master node within a wireless mesh network; and
   a plurality of display modules forming the modular display, wherein each display module acts as a node within the wireless mesh network and receives data from the display controller to display, and wherein each specific display module among the plurality of display modules further comprises:
   a memory for buffering images to display; and
   a processor or microcontroller executing software stored in a non-transitory computer-readable medium to:
      receive one or more network packets each with a portion of a new image to display at the specific display module;
      store each portion of the new image until an entire frame of the new image is received;
      decode the entire frame into a display format for the specific display module; and
      store the decoded frame into a display buffer in the memory.

7. The modular digital display system of claim 6, wherein each of the display modules further comprises a wireless communication module for communicating with the mesh network.

8. The modular digital display system of claim 7, wherein each specific display module further comprises a real-time clock interfaced to the processor or microcontroller, and the software executed on the processor or microcontroller further comprises instructions to:
   synchronize the real-time clock with a received global synchronization signal;
   upon timing controlled by the real-time clock, retrieve a next frame stored in the display buffer; and
   transmit the next frame to the LED drivers for display.

9. The modular digital display system of claim 6, wherein the display controller further comprises a processor or microcontroller executing software stored in a non-transitory computer-readable medium to:
   render source data to a display adapter or digital desktop;

screen scrape the rendered display and create a one to one pixel map;

determine, based on a resolution of the rendered display, a number of display modules of the plurality of display modules, and a layout of the modular display, a specific x-y coordinate for a specific display module among the plurality of display modules;

from the starting x-y coordinate, determine RGB brightness values for every pixel in the pixel map to be displayed on the specific display module;

construct the determined RBG brightness values into network packet data; and transmit the constructed network packet data across the mesh network to the specific display module.

10. A modular digital display system, comprising:

a display controller processing source data to display on a modular display, and acting as a master node within a wireless mesh network;

a plurality of display modules forming the modular display, wherein each display module acts as a node within the wireless mesh network and receives data from the display controller to display;

wherein the display controller comprises a controller processor or controller microcontroller executing software stored in a non-transitory computer-readable medium to:

render source data to a display adapter or digital desktop;

screen scrape the rendered display and create a one to one pixel map;

determine, based on a resolution of the rendered display, a number of display modules of the plurality of display modules, and a layout of the modular display, a specific x-y coordinate for one of the display module among the plurality of display modules;

from the starting x-y coordinate, determine RGB brightness values for every pixel in the pixel map to be displayed on the specific display module;

construct the determined RBG brightness values into network packet data; and transmit the constructed network packet data across the mesh network to the one of the plurality of display modules; and wherein each specific display module among the plurality of display modules comprises:

a wireless communication module for communicating with the mesh network;

a memory for buffering images to display;

one or more sensors for automatic locating of the specific module within the modular display;

a real-time clock; and a display module processor or display module microcontroller connected to and in communication with LED drivers controlling one or more individual LEDs of the module, the display module processor or display module microcontroller executing software stored in a non-transitory computer-readable medium to:

receive one or more network packets each with a portion of a new image to display at the specific display module;

store each portion of the new image until an entire frame of the new image is received;

decode the entire frame into a display format for the specific display module;

store the decoded frame into a display buffer in the memory;

synchronize the real-time clock with a received global synchronization signal;

upon timing controlled by the real-time clock, retrieve a next frame stored in the display buffer; and transmit the next frame to the LED drivers for display.

11. A modular digital display system, comprising:

a display controller processing source data to display on a modular display, and acting as a master node within a wireless mesh network; and a plurality of display modules forming the modular display, wherein each display module acts as a node within the wireless mesh network and receives data from the display controller to display, and wherein each display module further comprises:

a real-time clock; and a processor or microcontroller interfaced to the processor or microcontroller, the processor or microcontroller executing software stored in a non-transitory computer-readable medium to:

synchronize the real-time clock with a received global synchronization signal;

upon timing controlled by the real-time clock, retrieve a next frame stored in a display buffer for display on the specific display module;

wherein the display controller further comprises a processor or microcontroller executing software stored in a non-transitory computer-readable medium to:

render source data to a display adapter or digital desktop;

screen scrape the rendered display and create a one to one pixel map;

determine, based on a resolution of the rendered display, a number of display modules of the plurality of display modules, and a layout of the modular display, a specific x-y coordinate for a specific display module among the plurality of display modules;

from the starting x-y coordinate, determine RGB brightness values for every pixel in the pixel map to be displayed on the specific display module;

construct the determined RBG brightness values into network packet data; and transmit the constructed network packet data across the mesh network to the specific display module.

12. A method of operating a modular digital display system, comprising:

operating a display controller processing source data to display on a modular display, and acting as a master node within a wireless mesh network;

arranging a plurality of display modules to form the modular display, wherein each display module acts as a node within the wireless mesh network and receives data from the display controller to display;

rendering, by the display controller, source data to a display adapter or digital desktop;

screen scraping, by the display controller, the rendered display and creating a one to one pixel map;

determining, by the display controller and based on a resolution of the rendered display, a number of display modules of the plurality of display modules, and a layout of the modular display, a specific x-y coordinate for a specific display module among the plurality of display modules;

from the starting x-y coordinate, determining, by the display controller, RGB brightness values for every pixel in the pixel map to be displayed on the specific display module;

constructing, by the display controller, the determined RBG brightness values into network packet data;

transmitting the constructed network packet data across the mesh network from the display controller to the specific display module;

including a real-time clock in each display module;

synchronizing, at each display module, the real-time clock with a received global synchronization signal; and upon timing controlled by the real-time clock, each display module retrieving a next frame stored in a display buffer for display.

* * * * *